Sept. 8, 1953     R. T. FOLEY ET AL     2,651,144
GLASS-TO-METAL SEAL
Filed Nov. 15, 1950
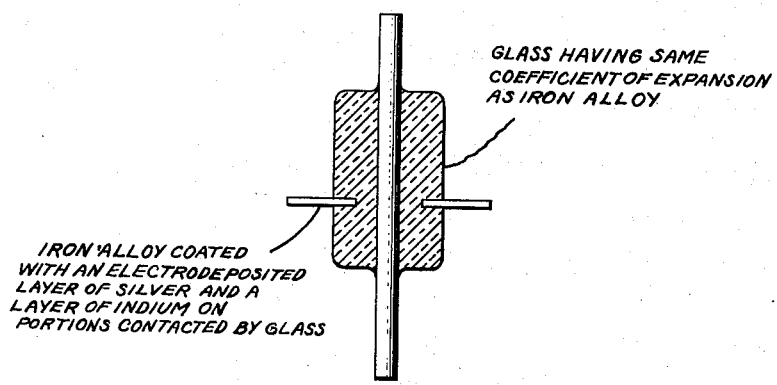
Inventors:
Robert T. Foley,
Herbert A. Omley,
by
Their Attorney.

Patented Sept. 8, 1953

2,651,144

UNITED STATES PATENT OFFICE 2,651,144

GLASS-TO-METAL SEAL

Robert T. Foley, Pittsfield, Mass., and Herbert A. Omley, East Nassau, N. Y., assignors to General Electric Company, a corporation of New York Application November 15, 1950, Serial No. 195,908

1 Claim. (Cl. 49—81)

The present invention relates to a glass-to-metal seal. More particularly, it is concerned with cast glass metal seals, that is, seals obtained by casting a molten or softened body of glass into contact with the metal member and to an improved method of preparing such seals.

In many glass-to-metal seals, the metal member is adapted to have one portion thereof embedded in or sealed to the glass member and a second portion adapted to be joined to a second metal member as for example by means of soldering or brazing. Such an arrangement is found for example in the electric bushings described in Patent 2,299,750, A. W. Hull et al., which patent more particularly describes a process for preparing such cast glass-to-metal seals.

In order to obtain a strain-free or substantially strain-free seal, it is desirable that the metal portion and the glass portion have substantially the same coefficient of expansion over the entire or at least a substantial portion of the temperature range from room temperature up to the softening temperature of the glass. Alloys which have the thermal expansion characteristics similar to those of glass are those including the iron alloys such as nickel-iron, cobalt-iron, nickel-cobalt-iron and chromium-cobalt-nickel-iron alloys. These alloys may be described as iron base alloys essentially containing either nickel, cobalt or both and having thermal expansion characteristics comparable to those of the glass to which they are sealed. Various glasses may be employed, examples of which are given in Patent 2,071,196, Burger et al., and Patent 2,478,626, Grigorieff. Lead-free glasses are believed preferable.

In a preferred method for manufacturing of the seals, the metal member, after having been cleaned and degassed by a heat treatment adapted to remove therefrom carbonaceous and other ingredients which may form bubbles in the final seal, is placed in a suitable mold and the molten glass poured into the mold and into contact with the portion of the metal member. Upon controlled cooling, the glass and metal member form an integral product characterized by a vacuum tight seal between the metal and glass members.

In the practice of this process of making cast glass-to-metal seals, it has been found that when the metal member is subjected to the elevated temperatures at or above about 600° C. during the casting operation and the subsequent anneal of the seal, the surfaces of the metal member not embedded in the glass, but subsequently to be used in the soldering or brazing of the metal member to a second metal part, become severely oxidized so that the exposed portions of the metal surface or member must be cleaned before it can be satisfactorily sealed as by soldering to a second metal part. Due to the fact that at this stage of manufacture the part comprises the metal member plus the glass member, most cleaning methods are not suitable. In fact, the relatively expensive buffing or grinding method of removing the oxide coating is in practice the preferred method which can be employed to obtain consistently good results.

The present invention has as its primary object to provide an improved method of making glass metal seals whereby this expensive buffing operation for cleaning the metal surfaces can be eliminated.

A further object of the invention is to provide an improved glass-to-metal seal which can be readily soldered subsequent to the casting operation without further treatment of the metal part.

A still further object of the invention is to provide a glass-to-metal seal comprising a metal member having a surface coating thereon which is readily and completely wet by the molten or softened glass.

In accordance with the present invention, the above mentioned objects and others which will become apparent from the following description are attained by providing the metal member with an oxidation resistant coating of silver prior to the casting of the glass-to-metal seal and further by coating at least those portions of the silver plated member which are joined to the glass body with a thin layer of indium metal in order to obtain a good wetting of the metal member by the molten or softened glass.

While the invention is applicable to any of the alloys referred to hereinbefore, it will be particularly described in connection with the manufacture of a glass-to-metal seal in which the metal member is composed of an iron-nickel alloy. A well known alloy of this type for glass-to-metal seal purposes is one containing about 57 to 59% iron and 41 to 43% nickel.

The invention is also applicable to any of a variety of glasses having the desired thermal coefficients of expansion and the term "glass" as used herein is to be understood as referring to any of the various known glasses having expansion characteristics suitable for making glass-to-metal seals with the specified alloys of iron, nickel or cobalt. An embodiment of the persent invention in the form of a bushing is shown in the accompanying drawing.

To obtain on the metal member a silver plating capable of withstanding the temperatures normally encountered in the casting of the glass-to-metal seal, it is necesary to first free the metal member of any oxide coating, dirt, grease or other material which will interfere with the plating operation. This cleaning step normally follows immediately after the hydrogen anneal of the metal member for the purpose of degassing the metal or in other words for removing from the metal any gas forming constituents which at the glass casting temperatures may result in bubble formation adjacent the seal and would interfere with the normal adhesion of the metal to the glass. Carbon is one of the principal materials removed during this hydrogen anneal which may be carried out at temperatures in the neighborhood of 1125°. In the practice of the present invention, this hydrogen anneal also has the added advantage of partially or completely reducing any oxide film present on the surface of this metal member.

To obtain an adherent silver plate, it has been found desirable to carry out the silver plating operation in two steps, the first of which is a preliminary "strike" in which a thin film of silver is applied at a high current density from a bath low in silver ion and high in cyanide ion concentrations while the principal portion of the silver plate is deposited from a second bath at a current density lower than the strike solution current density and from a bath higher in silver ion concentration.

For example, satisfactory silver plates have been obtained by depositing a thin layer of silver from a bath containing 1.5 grams per liter silver cyanide and 60 grams per liter sodium cyanide at a current density of approximately 16 amps. per sq. ft. Without allowing the part to dry, it is immediately transferred from this silver strike bath to a second silver plating bath containing 30 grams silver cyanide, 42 grams potassium cyanide and 45 grams potassium carbonate per liter and plated at a current density of from 2 to 8 amps. per sq. ft. Best results were obtained when the current density was quite low in the plating bath as for example from 1 to 2 amps. per sq. ft. for a few minutes and thereafter raised to a current density of about 8 amps. per sq. ft. for about 30 minutes or until there is obtained a silver plate having a thickness of from about 0.4 to 1 mil.

Following the plating operation, the silver plated part is preferably subjected to a hydrogen anneal. The purpose of the hydrogen anneal is two-fold. In the first place, it offers a convenient method for testing the plate in that a poor plate will blister when heated suddenly to about 850° C. in hydrogen. The second function of the hydrogen anneal is to enhance the steel-to-silver bond. Apparently, the heat treatment effects a partial diffusion of the silver into the base metal or of the components of the base into the silver plate. It is essential that this anneal be carried out in a reducing atmosphere since silver is quite permeable to oxygen and to effect the anneal in air for example may lead to blistering during subsequent casting of the glass about the metal member. The time for this anneal is not critical, about 30 minutes being found sufficient to obtain the desired adhesion and blistering of defective parts. Longer times may be employed.

In order to obtain the desired wetting of the glass to the silver plated metal member, at least those portions of the silver plated member which will be in contact with the glass are provided with a thin layer of indium. The film of indium can be extremely thin and ordinarily will not exceed the thickness of $3 \times 10^{-5}$ inches. In fact films as thin as from 3 to $5 \times 10^{-6}$ inches have been entirely satisfactory.

While the coating of indium over the silver plate has been found essential to obtain a proper wetting of the metal surface during the casting of the glass, it has also been found equally essential that the underlying plate be composed of silver rather than any of the number of other metals. For example, the substitution of a nickel plate for the silver plate will not result in a vacuumtight glass-to-metal seal regardless of the amount of indium applied over the nickel surface. It appears therefore that the wetting action of the glass for the coated metal part apparently depends upon the presence of both the silver and the indium on that portion of the metal part which is sealed to the glass member.

The indium coating can be obtained by any of the usual methods for plating indium on to a base metal. For example, suitable indium plates have been obtained employing a solution of indium cyanide, and a current density of from 10 to 20 amps. per sq. ft. for times varying from 15 sec. to 5 minutes. Any other method of plating a thin coating of indium can also be used.

A preferred method for carrying out the process of the present invention comprises sandblasting the formed iron-nickel parts, hydrogen annealing the parts for the purpose of degassing the metal and thereafter pickling the annealed parts for about 5 minutes in a mixture composed of one part concentrated hydrochloric acid, one part concentrated sulphuric acid and one part concentrated nitric acid and nine parts water at a temperature of 60° to 90° C. This mixture has been found to be extremely efficient for removing the remaining oxide film from such an alloy. After pickling the parts are rinsed in water and immersed for a few seconds in a bright dip solution composed of two parts concentrated sulphuric acid and one part nitric acid in order to remove the black residue remaining after the pickling operation. The parts are then rinsed and transferred immediately to a sodium cyanide neutralizing solution comprising 5% sodium cyanide solution in water. After a suitable immersion time, for example about 15 minutes, in this solution, the parts are transferred while still wet to the silver strike solution and immersed as the cathode in the strike solution with the current on. The preliminary strike plate can be carried out at a current density of approximately 16–24 amps. per sq. ft. for from 30 to 60 seconds. The parts as removed from the strike solution are bright and shiny and are immediately transferred to the plating bath with the parts connected as cathodes to the power supply when immersed in the bath. In the plating bath, the parts are subjected to a current density of 2 amps. per sq. ft. for about 15 minutes and thereafter the current is raised to 8 amps. per sq. ft. for about 30 minutes. When removed from the plating bath the plated parts are rinsed, air dried and annealed about 30 minutes in hydrogen atmosphere at 850° C. Any parts on which there are noticeable blisters after anneal are rejected while the remaining parts are provided with a thin plate of indium. In general it may be found desirable to rinse the parts in acetone or other suitable degreasing agent prior to the indium plating to remove any surface films of an organic nature. A plating with indium for about 1 minute at a current density of 15 amps. per sq. ft. at room temperature will provide an indium film of sufficient thickness. The indium plated parts are rinsed and dried by being placed in an oven at 175° C. for several hours. During drying at this temperature the indium diffuses into the silver plate. After removal from the oven, the parts are ready for the manufacture of glass-to-metal seals employing the technique described in the above mentioned Hull et al. patent.

It will be noted that as the result of the present invention, there has been provided a novel glass-to-metal seal arrangement comprising a metal part and a glass part having similar coefficients of expansion from room temperature up to the softening point of the glass, the two parts being joined by an intermediate layer of silver and indium which is adapted to prevent oxidation of the metal member during the glass casting operation and to effect the desired wetting of the metal member by the molten or softened glass.

What we claim as new and desire to secure by Letters Patent of the United States is:

The method of making a cast glass-to-metal seal between a glass body and metal member composed of an alloy of iron and a metal of the group consisting of nickel and cobalt, which comprises electrodepositing a layer of silver on said metal member, annealing the silver-plated member in a hydrogen atmosphere to effect a partial diffusion of the silver layer into the metal member, electrodepositing on the silver layer a thin layer of indium and casting a glass having substantially the same coefficient of expansion as said metal member into contact with the indium-plated portion of said metal member.

ROBERT T. FOLEY.
HERBERT A. OMLEY.

References Cited in the file of this patent

UNITED STATES PATENTS

| Number | Name | Date |
|---|---|---|
| 2,464,821 | Ludwick | Mar. 22, 1949 |
| 2,555,877 | Doran | June 5, 1951 |

FOREIGN PATENTS

| Number | Country | Date |
|---|---|---|
| 359,014 | Great Britain | Oct. 12, 1931 |

OTHER REFERENCES

Product Engineering, "Indium Surface-Alloys Resist Corrosion and Wear," October 1943, pages 630–632.

Scientific American, "Versatile Indium," April 1944, pages 154–156.